Nov. 9, 1948.
J. H. DE FREES
2,453,413
VALVE STRUCTURE
Filed April 18, 1946
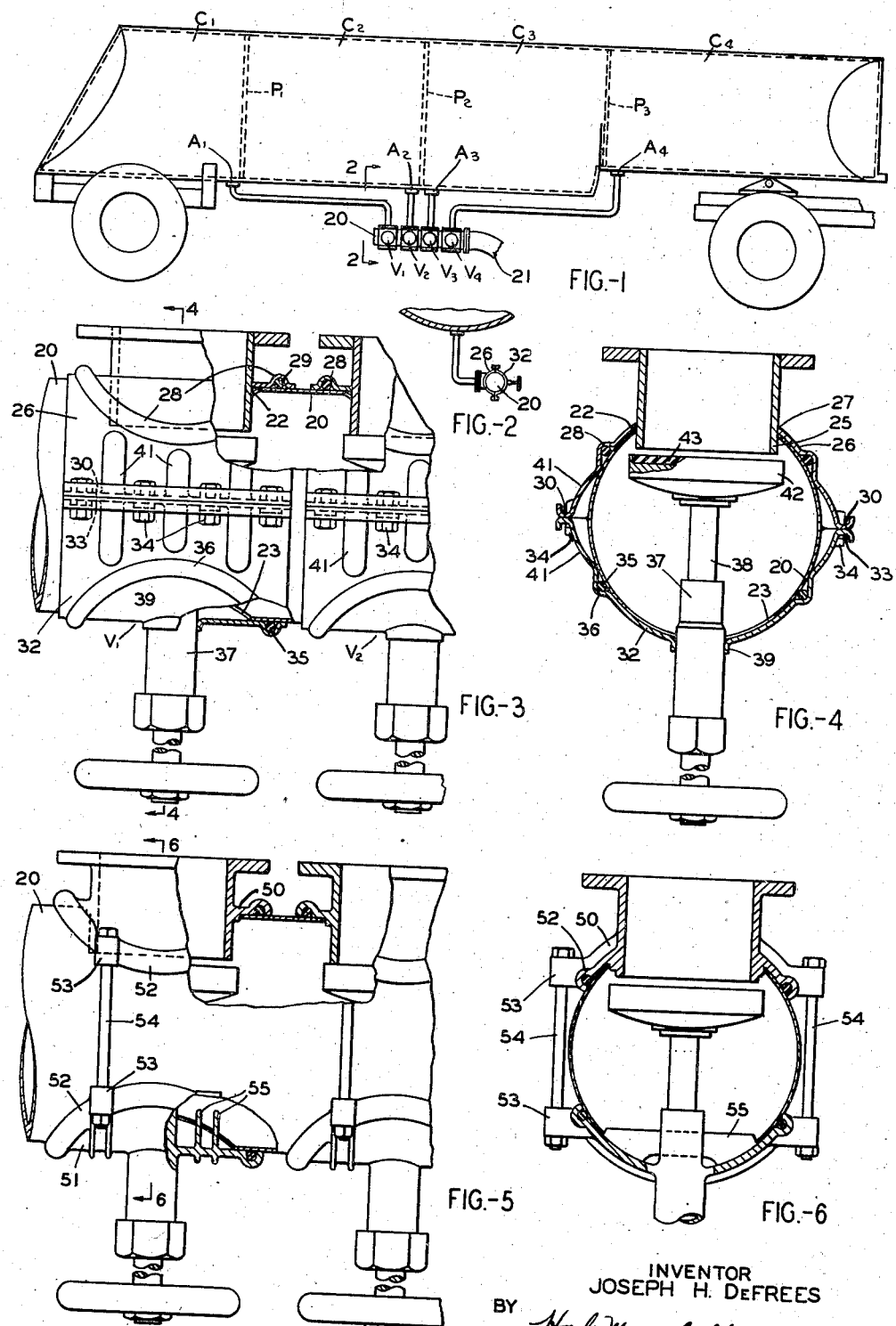
INVENTOR
JOSEPH H. DeFREES
BY *Hyde, Meyer, Baldwin and Doran*
ATTORNEYS Patented Nov. 9, 1948

2,453,413

UNITED STATES PATENT OFFICE 2,453,413

VALVE STRUCTURE

Joseph H. De Frees, Warren, Pa., assignor to Pennsylvania Furnace and Iron Company, Warren, Pa., a corporation of Pennsylvania Application April 18, 1946, Serial No. 663,065

4 Claims. (Cl. 251—156)

The invention relates to novel and improved valve structures.

An object of the invention is to provide a novel and improved valve structure of considerably lighter weight and lower cost than heretofore obtainable.

Another object of the invention is to provide such novel and improved valve structure particularly adapted for use as a cross-valve in a liquid flow manifold.

A further object of the invention is to provide such valve structure which permits increased flow through the valve-carrying manifold or pipe.

A further object is to provide a valve structure adapted to be applied to a manifold or pipe at any desired angle through the entire circumferential span of the said manifold or pipe. A further object is to provide a valve structure adapted to be used as an element in a multiple cross-valve assembly, but whereby the conventional cross-valve gasketed joints are entirely dispensed with.

A further object is to provide a valve structure permitting the side-by-side assembly of a greater number of valves in a tandem assembly by reason of the smaller longitudinal space occupied by each valve.

A further object is to provide a cross-valve structure permitting unobstructed drainage of the valve-carrying manifold.

Other objects and advantages will be apparent from a study of the following description in conjunction with the accompanying drawings, in which:

Fig. 1 is a view in side elevation showing a liquid transportation tank equipped with a valve structure embodying the present invention;

Fig. 2 is an end elevational view taken approximately on the line 2—2 of Fig. 1;

Fig. 3 is a fragmentary view greatly enlarged, partly in section and partly in side elevation showing in detail my novel valve structure;

Fig. 4 is a sectional view taken on the line 4—4 of Fig. 3;

Fig. 5 is a view similar to Fig. 3 but showing a somewhat modified embodiment of the invention;

Fig. 6 is a sectional view taken on the line 6—6 of Fig. 5.

It will be apparent to those skilled in the art upon a study of the drawings and the following description, that the novel and improved structure now to be described is adaptable to the installation of one or other of a variety of valve types. The structure has been particularly developed to solve problems in the installation of cross-valves in a manifold or header beneath a multi-compartment tank for gasoline or oil transportation, and the embodiments hereinafter described are illustrated in this connection.

Referring briefly to Fig. 1 there is shown a conventional tank truck provided with a series of compartments separated by bulkheads. Each such compartment is normally provided with a bottom outlet controlled by a so-called cross-valve. The plurality of cross-valve thus required, have, in the past, been formed integrally usually from heavy metal such as cast iron having a top inlet communicating with the tank compartment and incorporating the valve seat, and having two opposed lateral ports for communication with similar adjoining and cooperating ports on other valve bodies disposed in tandem therewith.

Such lateral ports were provided with connecting flanges for attachment to the complementary flanges of the aforesaid respectively adjoining valve bodies. The series of valve bodies thus connected in tandem with intermediate sealing gaskets provided a continuous passage constituting the manifold heretofore referred to.

Such an arrangement was cumbersome, the individual valves were expensive, and little or no flexibility was permitted in the assembly and relative position of the valves. It was difficult or impossible to thus build up a header or manifold without leaving low spots adjacent the valve controls or connecting flanges, and such low spots would not drain by gravity, but left trapped pools of liquid which might be highly volatile and inflammable. All these and other disadvantages of the prior construction are avoided by means of the present invention.

Fig. 1 shows a series of tank compartments $C_1$, $C_2$, etc., separated by partitions $P_1$, $P_2$, etc. At the bottom of each compartment is an outlet aperture $A_1$, $A_2$, etc., in controllable communication, as will appear, with a common manifold 20 and discharge pipe 21. Said communication is controlled by individual valve structure $V_1$, $V_2$, etc., carried on manifold 20. The valves are shown as arranged horizontally in a longitudinal series along the manifold, and it will be apparent from a glance at the drawings that any one or more valves may be operated to permit individual discharge from any one selected compartment, or simultaneous discharge from more than one. Other arrangements than the one actually here shown are quite feasible, and those skilled in the art will have no difficulty in rearranging the piping and valves in such way, for example, as will permit pumping liquid from one compartment to another or other such expedient.

The manifold 20 is preferably formed from metal tubing such as seamless steel tubing or the like, of relatively low wall thickness. Referring particularly to Figs. 3 and 4 the tubing is provided with two diametrically spaced, opposed apertures 22 and 23. In the embodiment shown aperture 22 receives the fluid inlet and annular valve seat mechanism, and aperture 23 accommodates a valve stem and stuffing box. This particular arrangement may be reversed or modified depending on any convenient or necessary angularity of the valve stem or the outlet from the tank partition.

The annular valve seat 25 is supported in a saddle 26 which is a semi-cylindrical pressed steel part having an internal wall surface complementary to the external surface of manifold 20. The valve seat 25 is of tubular character fitted within an aperture 27 in the saddle, preferably by welding. The saddle 26 is further provided with an outturned bead 28 adapted to lie outside and beyond the peripheral edge of aperture 22, and to receive an annular sealing gasket 29. Along its longitudinal edges the saddle 26 is provided with radially outturned attaching flanges 30.

I have provided a generally similar saddle 32, likewise provided with radially outturned flanges 33 for attachment to flanges 30 by bolts 34 or other preferably removable attaching means. Saddle 32 is also provided with an annular gasket 35 carried in its bead like housing 36.

Saddle 32 carries the valve stem guide 37 within which a valve stem 38 is advanceable or retractable by conventional screw threaded arrangement. The valve stem guide 37 is conveniently welded to a flange 39 surrounding a fitted aperture in saddle 32. The valve stem carries the usual valve head 42 which may be equipped with a resilient sealing member 43 for contact with valve seat 25. The saddles are provided with strengthening ribs 41 along the sides thereof.

From an examination of the structure just described it will be apparent that the valve structure and manifold parts are of light weight and can be supplied at low cost. No gasketed joint is required between cross-valves since the manifold pipe 20 maintains the longitudinal continuity of the structure. The valves may be placed considerably closer together, if desired, than the cast iron structures of the prior art. The manifold is made from steel tubing and extensions or branches may readily be added by welding. Complete drainage is permitted as will be evident from the fact that any break in the continuity of the manifold wall is disposed along the side walls and above the bottom wall, said bottom wall being unobstructed.

Figs. 5 and 6 show a slightly modified embodiment of the invention wherein the valve seat and head are respectively carried in cast saddles 50 and 51, the manifold 20 being identical with that already described in connection with Figs. 3 and 4. All parts of saddles 50 and 51 are integrally cast including the channeled beads 52, and the bosses 53 which accommodate the long connecting bolts 54. If desired transverse ribs 55 may be provided within the concavity of saddle 51 for strengthening purposes.

Bearing in mind the valve assembly and structure hereinabove described, it will be apparent that the manifold 20 may be disposed in any suitable position below the tank compartment level, and the various valves may be angularly inclined for vertical, horizontal, or other convenient alignment to facilitate manipulation. The manifold 20 may be rotated through any angle dependent upon the desired inclination of the leads to the various tank compartments.

What I claim is:

1. Liquid flow control means comprising a conduit having a tubular wall provided with a pair of diametrically opposed apertures, a pair of opposed saddles carried on said conduit, one respectively on the outer conduit wall surrounding each aperture, each said saddle having an inner surface complementary to, and conforming in contour to, the said outer conduit wall, one said saddle carrying a valve guide, and the other said saddle carrying an annular valve seat, said valve seat extending within the adjacent aperture in said conduit wall, a valve stem carried by said valve guide and extending inwardly through the aperture in said conduit wall adjacent thereto, both said saddles having aligned means for establishing a rigid but removable connection therebetween.

2. Liquid flow control means comprising a conduit having a tubular wall provided with a pair of diametrically opposed apertures, a pair of opposed saddles carried on said conduit, one respectively on the outer conduit wall surrounding each aperture, each said saddle having an inner surface complementary to, and conforming in contour to, the said outer conduit wall, one said saddle carrying a valve guide, and the other said saddle carrying an annular valve seat said valve seat extending within the adjacent aperture in said conduit wall, a valve stem carried by said valve guide and extending inwardly through the aperture in said conduit wall adjacent thereto, both said saddles having aligned means for establishing a rigid but removable connection therebetween, each said saddle being provided with an inwardly opening, annular, continuous channel adapted to surround its respective conduit wall aperture, and to receive an annular gasket for sealing contact with said wall.

3. Liquid flow control means comprising a conduit having a tubular wall provided with a pair of diametrically opposed apertures, a pair of opposed saddles carried on said conduit, one respectively on the outer conduit wall surrounding each aperture, each said saddle having an inner surface complementary to, and conforming in contour to, the said outer conduit wall, one said saddle carrying a valve guide, and the other said saddle carrying an annular valve seat, said valve seat extending within the adjacent aperture in said conduit wall, a valve stem carried by said valve guide and extending inwardly through the aperture in said conduit wall adjacent thereto, both said saddles having aligned means for establishing a rigid but removable connection therebetween, each said saddle being provided with an inwardly opening, annular, continuous channel adapted to surround its respective conduit wall aperture, and to receive an annular gasket for sealing contact with said wall, said valve seat having a bored passage therethrough to provide a fluid inlet path, and said saddles and valve seat being formed from sheet metal.

4. Liquid flow control means comprising a conduit having a tubular wall provided with a pair of diametrically opposed apertures, a pair of opposed saddles carried on said conduit, one respectively on the outer conduit wall surrounding each aperture, each said saddle having an inner surface complementary to, and conforming in contour to, the said outer conduit wall, each said saddle being formed from cast metal, one said saddle having integrally cast therewith a valve guide, the other said saddle having integrally cast therewith an annular valve seat having a bored passage therethrough to provide a fluid inlet path, said valve seat extending within the adjacent aperture in said conduit wall, a valve stem carried by said valve guide and extending inwardly through the aperture in said conduit wall adjacent thereto, each said saddle being provided adjacent its peripheral edge with an inwardly opening, annular, continuous channel adapted to surround its respective conduit wall aperture, and to receive an annular gasket for sealing contact with said wall, both said saddles having aligned means for establishing a rigid but removable connection therebetween.

JOSEPH H. DE FREES.

REFERENCES CITED

The following references are of record in the file of this patent:

UNITED STATES PATENTS

| Number | Name | Date |
|---|---|---|
| 1,298,173 | Cadman | Mar. 25, 1919 |

FOREIGN PATENTS

| Number | Country | Date |
|---|---|---|
| 786,740 | France | 1935 |